No. 711,274. Patented Oct. 14, 1902.
J. R. AYERS.
FERTILIZER DISTRIBUTER.
(Application filed July 25, 1902.)
(No Model.) 3 Sheets—Sheet 1.
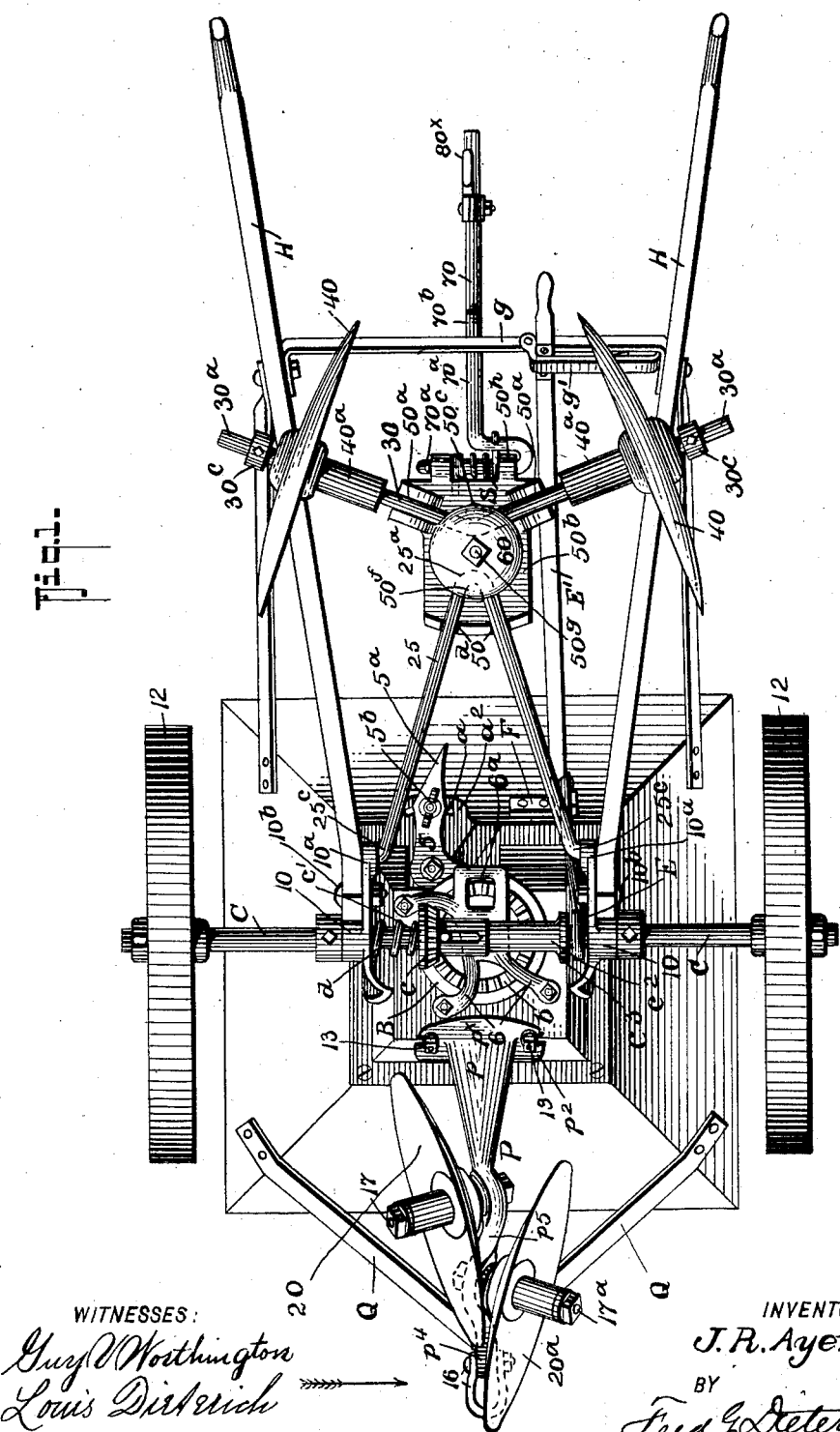
WITNESSES: INVENTOR
J. R. Ayers.
BY
ATTORNEYS.

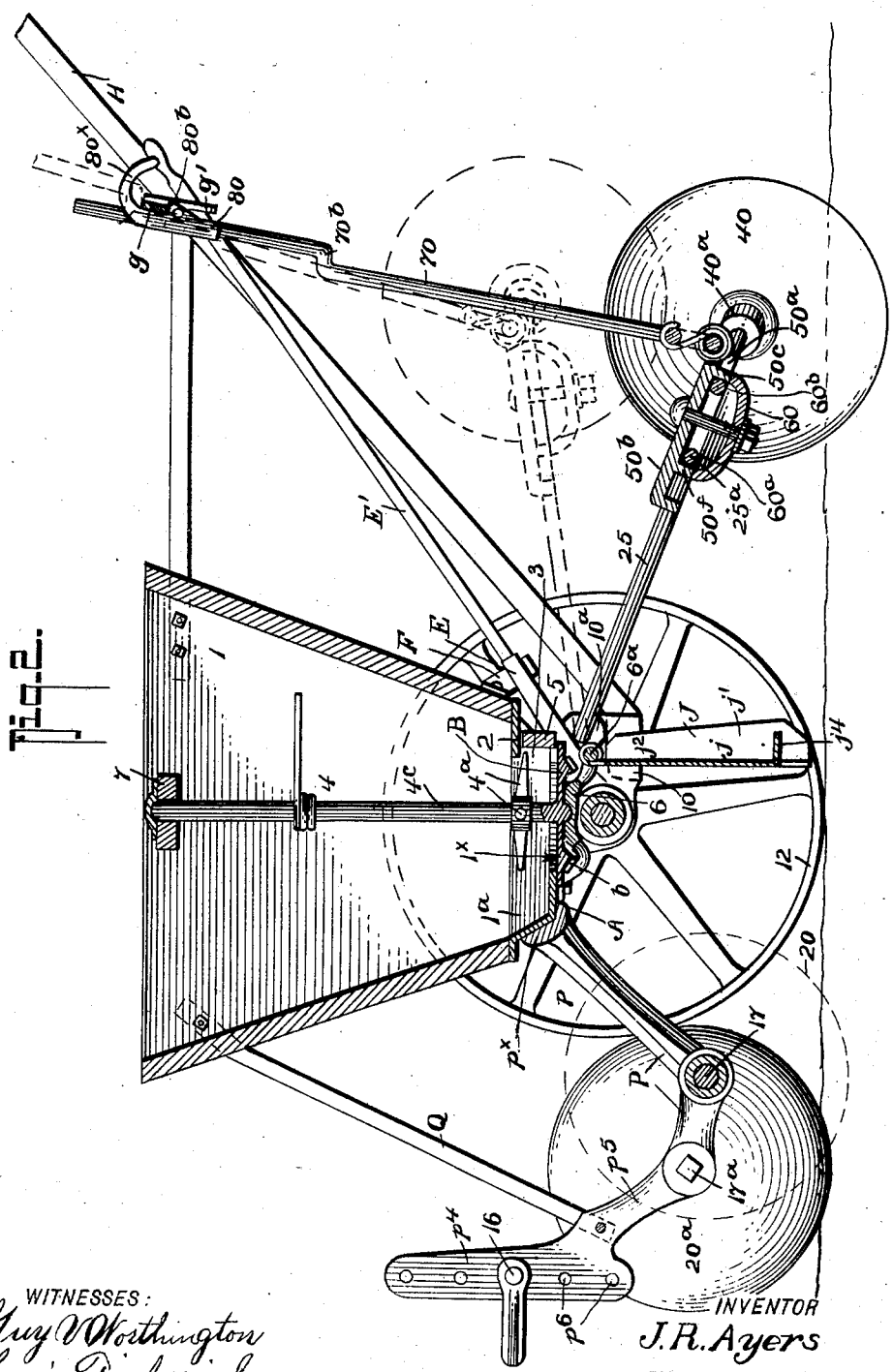

No. 711,274. Patented Oct. 14, 1902.
J. R. AYERS.
FERTILIZER DISTRIBUTER.
(Application filed July 25, 1902.)
(No Model.) 3 Sheets—Sheet 3.
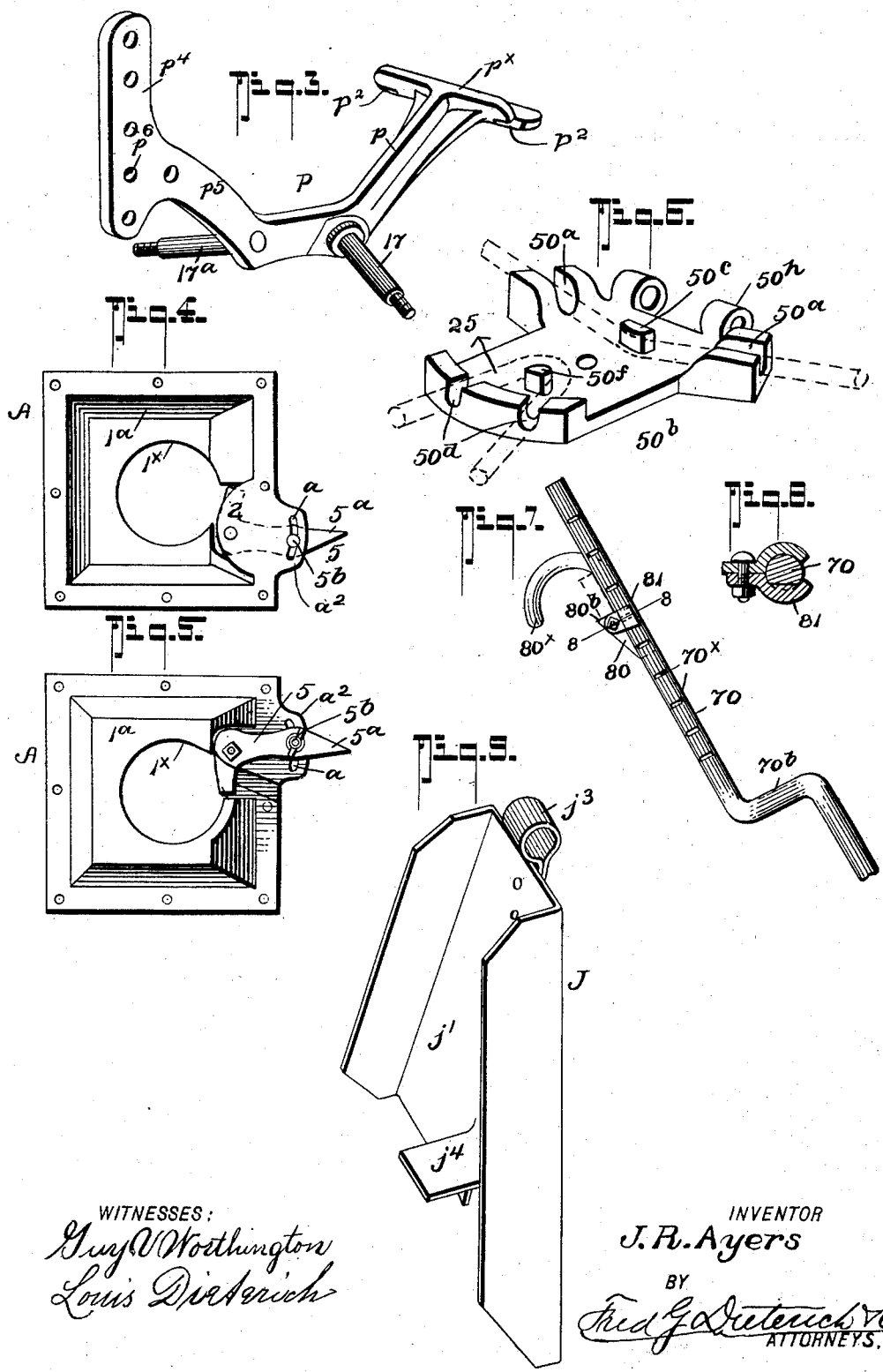
WITNESSES:
Guy V Worthington
Louis Dieterich
INVENTOR
J. R. Ayers
BY
Fred G Dieterich & Co
ATTORNEYS.

UNITED STATES PATENT OFFICE.

JAMES R. AYERS, OF PETERSBURG, VIRGINIA.

FERTILIZER-DISTRIBUTER.

SPECIFICATION forming part of Letters Patent No. 711,274, dated October 14, 1902.

Application filed July 25, 1902. Serial No. 116,982. (No model.)

*To all whom it may concern:*

Be it known that I, JAMES R. AYERS, residing at Petersburg, in the county of Dinwiddie and State of Virginia, have invented a new and Improved Fertilizer-Distributer, of which the following is a specification.

My invention primarily seeks to provide an improved construction of fertilizer-distributing machine whereby the same can be economically manufactured and in which the parts are coöperatively combined to admit of their being readily assembled to produce a stable and durable mechanism which will effectively serve for its intended purposes.

In its generic nature my invention comprehends a peculiar and novel arrangement of covering devices pivotally suspended from a main casting, to which are connected all of the operative parts of the machine and coöperatively joined with rigidly-attached handle members, and a detent mechanism for adjusting the coverer devices vertically and independently of the movement of the handles.

My invention also includes a novel construction of bracket attached to and projected forwardly from the main casting, especially designed for properly supporting a peculiar arrangement of disk openers or trench-cutters and at the same time act as a draft member.

My invention also embodies an improved construction of adjustable gate devices for regulating the discharge of the fertilizer, an improved construction of fertilizer deflector or chute, a shifting means for connecting the drive-shaft with the agitator or stirrer in the hopper; and in its still more subordinate nature my invention consists in certain details of construction and peculiar combination of parts, all of which will hereinafter be fully explained, and specifically pointed out in the appended claims, reference being had to the accompanying drawings, in which—

Figure 1 is an inverted plan view of my improved fertilizer-distributer. Fig. 2 is a vertical longitudinal section of the same, the adjustability of the cover controlled by the detent devices being shown in dotted lines. Fig. 3 is a detail view of the combined draft-tongue and disk-opener-supporting member. Fig. 4 is a top plan view, and Fig. 5 is an inverted plan view, of the main casting. Fig. 6 is a detail view of the coupling devices hereinafter referred to. Fig. 7 is a detail view of the adjustable detent device hereinafter described. Fig. 8 is a cross-section on the line 8 8 of Fig. 7. Fig. 9 is a detail view of the distributer pan or chute.

In the practical construction of my present invention the same embodies a hopper 1, of the conventional shape, the bottom of which has a trough portion $1^a$, adjacent which at one side of the hopper, is mounted a deflector or guide bracket 2, that projects over the discharge-throat 3 of the hopper and in which the radial members $4^a$ of the rotary stirrer 4 travel to agitate the material at the discharge-throat and prevent choking. To regulate the feed of the discharge, I provide a gate 5, which is mounted in the throat 3, the construction of which is shown in detail in Figs. 4 and 5, from which it will be seen the said gate is supported upon the master-casting A, which is secured upon the bottom of the hopper and to which all of the operative parts of the machine are connected in the manner best illustrated in Fig. 1. The gate 5 is pivoted to swing in a horizontal plane upon the main casting A and is held adjacent the discharge-throat, and the said gate includes an extension or arm $5^a$, in which is mounted a winged nut and bolt $5^b$, held to engage with a segmental slot $a$ in the extension $a^2$ of the casting A, as shown, the several parts just described being arranged to provide for a quick and positive means for holding the gate 5 to its adjusted position, whereby to regulate the discharge of the fertilizer as desired.

It will be noticed from Fig. 2 the casting A has a pendent flange and a bottom, which forms the trough $1^a$, before referred to, and a central aperture $1^\times$, and on the said bottom portion beneath the opening $1^\times$ is fitted a plate B, which forms a closure member for the opening $1^\times$. The plate B is held to rotate in a horizontal plane and has fixedly secured to it the lower end of the stirrer-shaft $4^c$, which has a stepped bearing in the spider-bracket 6, detachably and pendently connected to the bottom of the casting A, as shown, and the upper end of the spider-shaft is held to turn in the cross-piece 7, secured to the hopper. The plate B has an integral pendent bevel gear-rim b, with which a drive-pinion c, slidably mounted on the shaft or axle C, is normally held to engage with the rim b by a coil-spring d, mounted upon the axle C and having a spring bearing against the end c' of the pinion c, as clearly shown in Fig. 1, by reference to which it will also be noticed that the pinion c engages a hub $c^2$, shiftably mounted on the shaft C and provided with a collar $c^3$, which coacts with the throw-arm E, pivotally mounted on the bracket F, secured upon the hopper and joined with a lever E', that extends upward and rides on the cross-bar g, which joins the two handle members H and coacts with a detent g' of any suitable construction whereby to hold the lever E' against the tension of the spring d when the drive-pinion c is shifted out of an operative position. The shaft C is journaled in the two oppositely-disposed brackets 10 10, detachably secured to the main casting A, and the said shaft carries the usual drive-wheels 12 12.

The spider-bracket 6 at its rear side is provided with a transversely-disposed circular portion $6^a$, provided for conveniently suspending the combined chute and deflector J, which is formed of a sheet-metal body comprising a bottom j, whose opposite edges are bent up to form upwardly-converging sides j', which continue to a contracted end $j^2$, and the latter has a loop or hook $j^3$, which may be an integral part, as shown in Fig. 2, or an attached member, as shown in Fig. 9, to engage with the portion $6^a$ of the casting 6. The lower end of the body j is slitted longitudinally, whereby to provide a tongue bent at right angles to produce an abutment $j^4$, which has for its purpose to separate and deflect the fertilizer or other material that is discharged from the hopper. By providing a combined deflector and chute, as described, the same can be conveniently attached, and by reason of its loose connection it will readily trail over the ground and be agitated to facilitate the downflow of the material thereover, and by reason of its angle portion or abutment $j^4$ projecting in the path of the said flow of material the latter will be spread laterally, and thereby well distributed within the trench or furrow.

P designates a combined draft-bar and cutter-disk carrier, the peculiar construction of which forms an essential feature of my invention. This bar comprises a body portion substantially V-shaped, one member (the rear upwardly-extending one, p) being disposed in a direct longitudinal plane relatively to the hopper, and the upper end of said member p terminates in a laterally-extended angle-bracket $p^\times$, adapted to seat against the edge of the main casting A, to which it can be firmly and detachably secured by the nutted bolts 13 13, which engage with the bifurcated ends $p^2 p^2$ of the bracket $p^\times$, as shown. The front member $p^5$ of the V portion of the bar P merges with the vertically-extended portion $p^4$, provided with a series of apertures $p^6$ for the clevis-bolt 16. At the angle end the V-shaped portion of the bar P has a stud-bolt 17 projected laterally therefrom and downwardly at an angle to the body of the bar P, and at a suitable point in advance of the stud 17 the front member $p^5$ has a stud-bolt $17^a$, which projects laterally from the bar in a direction opposite to the projection of the stud-bolt 17, and the said bolt $17^a$ also extends downward at an angle, as shown. Upon each bolt 17 $17^a$ is mounted a revolving disk 20 $20^a$, which disks by reason of the correlative arrangement of the two stud-bolts 17 $17^a$ are so disposed that their cutting edges travel in substantially the same line, the rear one by reason of its being in a plane below the front one serving to deepen the trench or furrow made by the front disk and to throw the dirt in a direction opposite to the throw of the front disk, whereby the side pressure of both disks is balanced one by the other. The front end of the bar P is braced by the side bars Q Q, bolted at one end to the hopper and at the other end to the bar P.

So far as described, it will be noticed, all of the operating mechanism is directly or indirectly joined with the single or master casting A, and in the complete construction of my fertilizer-distributer I employ coverer devices, which are also connected with the master-casting, and these devices, which are best shown in Figs. 1 and 2, include a frame formed of a stout yoke-shaped bar 25, the central portion of which is bent to form a loop $25^a$ for engaging a special form of coupling, presently again referred to. The ends of the bar 25 are bent at right angles to form pintles $25^c$ $25^c$ to engage and rock in the apertured ears $10^a$ $10^a$ of the brackets 10 10, which brackets 10 10, it should be stated, are also provided with stud-bolts $10^b$ $10^b$, which fixedly joint the lower ends of the handles H H with the main casting.

30 designates an axle bent at an obtuse angle and disposed in a horizontal plane upon the opposite ends $30^a$ $30^a$, on each of which is mounted a rotary disk 40, provided with long hubs $40^a$ $40^a$, whereby to form solid bearings upon the members $30^a$ $30^a$ and to hold the disks from running off the ends of the members $30^a$ $30^a$. Said members have stops $30^c$ $30^c$, as shown. The bent axle 30 has its central portion held to engage with seats $50^a$ $50^a$, formed in the oppositely-disposed pendent lugs, which are an integral part of the top plate $50^b$ of the coupling devices, and said central portion of the axle 30 extends over the front edge of a pendent lug $50^c$, which is also a part of the plate $50^b$, and the latter is provided with a pendent portion at its front edge, in which are formed seats $50^d$ $50^d$ for the spread ends of the yoke-bar 25, the loop end of which extends over the rear edge of a pendent lug $50^f$ of the plate $50^b$. Centrally the plate $50^b$ has a central aperture for the clamp-bolt $50^g$, on which is fitted the washer 60, having suitably-shaped seats 60ª 60ᵇ to snugly fit the correspondingly-shaped ends of the members 25 and 30. By reason of the peculiar construction of the coupling mechanism, as described, said mechanism can be quickly and durably fitted in an operative position and as quickly disconnected, as desired.

To provide for positively holding the cover-disks down to an operative position (see Fig. 2) and to different distances of penetration, I employ a combined lift and detent mechanism the peculiar construction of which and its coöperative arrangement with the coverer devices and the fixed handle members forms an important part of my invention. By referring now more particularly to Figs. 1 and 2 it will be noticed said lift and detent devices comprise a stout bar 70, the lower end of which is bent into a right-angle loop, and pivotal arm 70ª, adapted to engage and rock on the apertured lugs 50ʰ 50ʰ on the rear edge of the coupling-plate 50. The bar 70 extends upward and engages with the cross member $g$, that joins the handles, and at a suitable point the bar 70 has an angle portion 70ᵇ, which forms a means for supporting the coverer devices when elevated to an inoperative position, as indicated in dotted lines in Fig. 2. To cause the bar 70 to automatically move to its locked position with the bar $g$ and to hold it in engagement with said bar $g$ under ordinary usage and when to either its elevated or depressed position, a coiled spring S, held to coöperate with the hinged end 70ª of the bar 70 and the ears 50ʰ on the plate 50, is provided.

To hold the coverer devices down to their operative position and to penetrate the furrow or trench sides at different depths, as desired, I provide the upper end of the bar 70 with serrations 70ˣ for adjustably holding the combined finger-lift and detent device (shown in detail in Figs. 7 and 8) which comprises a long plate 80 to engage one side of the bar 70, and clamp-plate 81, bolted to plate 80 and having a portion made to interlock with the serrations 70ˣ in said bar, and the plate 80 has a finger-hook 80ˣ, that projects rearwardly to extend over the cross-bar $g$, and a rearwardly-extending lug 80ᵇ to extend under said bar $g$, as clearly shown in Fig. 2.

From the foregoing, taken in connection with the drawings, it is believed the complete construction and operation and the advantages of my invention will be apparent. By reason of the peculiar combined draft and supporting bar P and the manner in which the trench or furrow openers are attached a very effective means for digging the furrow is provided and for supporting the disks on a draft member in such manner that the side pressure of one disk is balanced by the other. The single casting on the bottom of the hopper provides for joining all of the operative parts on the axle-held member. The manner of supporting the rear end of the coverning mechanism admits of quickly changing the position of the said mechanism from an inoperative to an operative one, which is accomplished by slipping the detent devices that engage the bar $g$ to a released position, and when thus released the same are restored automatically to the position at which it is desired to have to hold the coverer devices at such adjustments desired.

While I have described my invention as especially designed as a fertilizer-distributer, it is obvious with but slight modifications of the dropping mechanism it may be utilized for other planting purposes.

Having thus described my invention, what I claim, and desire to secure by Letters Patent, is—

1. In a machine as described, the combination of a hopper, a metal bottom detachably connected thereto, two disks working one in front of the other to cut the same trench, and in different horizontal planes, the rear one the lowest, a supporting member having journals for the disks projected laterally therefrom at different angles, and in different horizontal planes, said member having a portion for detachably joining with the hopper-bottom, and having its front end extended vertically to form a draft-bar, all being arranged substantially as shown and described.

2. The combination with the hopper-bottom; of the member P, comprising a V-shaped portion, whose rear end terminates in an angle-bracket for making fast to the hopper-bottom, and its front end merged with the vertical clevis-holding draw-bar, said member P having a journal projected laterally and downwardly from the apex of the V portion, and a second journal member at a point in advance of the first journal member, and projected laterally and downwardly in a direction opposite the other journal member, all being arranged substantially as shown and described.

3. In a machine as described, the combination with the hopper, the dropping and the conveying means; of a draft-bar secured to the hopper and projected forwardly thereof in a longitudinal plane, a pair of disk openers mounted on said bar one in front of the other, said openers being relatively disposed to throw the dirt to opposite sides and journaled in different horizontal planes, substantially as shown and described.

4. A machine as described, in combination with the hopper having a discharge-throat at the side of its bottom; of a combined chute and deflector, consisting of the body pendently supported from the hopper to swing in a longitudinal plane, and having its sides bent back at right angles, and a portion of the lower end of its bottom bent inwardly and rearwardly at right angles, for the purposes specified.

5. In a machine as described, a coverer mechanism, comprising in combination with the hopper and its discharging means, the handles fixedly connected with the hopper, and the handle cross-bar $g$; a frame mounted at its rear end on the hopper to swing in a vertical plane, said frame including a transversely-disposed axle, covering devices mounted thereon, a lifting-bar connected with the swingable frame, detent devices carried on said bar and adapted to coöperate with the handle cross-bar $g$, and means for automatically shifting said detent devices into a locked engagement with the cross-bar $g$, for the purposes described.

6. In a machine as described, the combination with the hopper-bottom, having pendent ears at the rear edge; of the yoke-bar 25 pivotally hung on the pendent ears of said bottom, the cross member 30 disposed in the plane of the bar 25, clamping devices for holding the two members 25 and 30 in horizontal alinement, coverer-disks mounted on the bar 30, the handles, and means for supporting the bars 25 and 30 and the coverer-disks in an elevated position, said means comprising a lift member, having portions for engaging the handle-bar $g$, and means for automatically moving said lifting-bar into engagement with the handle-bar $g$, as set forth.

7. In a machine as described, the combination with the hopper, the handles, and the handle cross-bar $g$; of the coverer-disk-supporting frame pivotally hung at its front end on the hopper to swing in a vertical plane, a lift-bar fulcrumed on said frame, and spring devices for automatically forcing the lift-bar against the handle cross-bar, said cross-bar having an angle portion to slip over the handle cross-bar, whereby to support the coverer-frame at its elevated or inoperative position, and an adjustable stop on the bar adapted to engage the under side of the handle-bar $g$ to hold the coverer devices to their penetrating position, as specified.

8. In a machine as described, the combination with the hopper, and the dropping devices, which coöperate therewith; of a coverer mechanism, which comprises in combination, a V-shaped frame 25, having its front end bent to form pintles to pivotally engage with the hopper, whereby to provide for swinging the said frame 25 in a vertical plane, a cross member 30, covering-disks mounted thereon, clamping devices for connecting the members 25 and 30 and to hold them in horizontal alinement, and means for lifting the rear end of the coverer mechanism, said means including detent devices for interlocking with the handles of the machine, to hold the coverer mechanism to its vertically-adjusted positions, as set forth.

9. In a machine as described, the combination with the hopper, the dropping devices, the handles, the handle cross-bar $g$, and the coverer devices, the latter including a supporting-frame, hinged at its front end to the hopper-bottom to swing in a vertical plane; of the rod 70, said rod having a spring-hinge connection with the coverer-frame, and adapted to be normally held in engagement with the handle cross-bar $g$, said rod 70 having an angle-shoulder for engaging with the upper edge of the handle cross-bar $g$, a stop adjustably mounted on the rod 70, said stop including a hook member adapted to project over the upper edge of the cross-bar $g$, and a lug for engaging with the lower edge of the said cross-bar, all being arranged substantially as shown and for the purposes described.

JAMES R. AYERS.

Witnesses:
R. B. WILLCOX, Jr.
JAMES DUNN.